United States Patent
Otxoa-Aizpurua Calvo et al.

(10) Patent No.: US 12,006,086 B2
(45) Date of Patent: Jun. 11, 2024

(54) PACKAGING METHOD AND APPARATUS

(71) Applicant: ULMA Packaging, S. Coop., Oñati (ES)

(72) Inventors: Alberto Otxoa-Aizpurua Calvo, Oñati (ES); Eneko Izquierdo Ereno, Oñati (ES)

(73) Assignee: ULMA Packaging, S. Coop, Oñati (ES)

(*) Notice: Subject to any disclaimer, the term of this patent is extended or adjusted under 35 U.S.C. 154(b) by 634 days.

(21) Appl. No.: 16/448,707

(22) Filed: Jun. 21, 2019

(65) Prior Publication Data

US 2020/0031507 A1    Jan. 30, 2020

(30) Foreign Application Priority Data

Jul. 27, 2018  (EP) ..................................... 18382564

(51) Int. Cl.
| | | |
|---|---|---|
| B65B 9/087 | (2012.01) | |
| B65B 31/02 | (2006.01) | |
| B65B 51/26 | (2006.01) | |
| B65B 57/00 | (2006.01) | |
| B65B 61/06 | (2006.01) | |

(52) U.S. Cl.
CPC ............ B65B 9/087 (2013.01); B65B 31/024 (2013.01); B65B 51/26 (2013.01); B65B 57/00 (2013.01); B65B 61/06 (2013.01)

(58) Field of Classification Search
CPC ....... B65B 9/087; B65B 31/024; B65B 51/26; B65B 57/00; B65B 61/06
USPC ......................................................... 53/433
See application file for complete search history.

(56) References Cited

U.S. PATENT DOCUMENTS

| | | | | |
|---|---|---|---|---|
| 2004/0139701 | A1* | 7/2004 | Cady .................... | B29C 65/7461 53/434 |
| 2012/0037796 | A1* | 2/2012 | Lehmann .................. | B65B 3/04 73/40 |
| 2016/0347489 | A1* | 12/2016 | Otxoa-Aizpurua Calvo ............... | B65B 9/20 |
| 2019/0023432 | A1* | 1/2019 | Müller .................. | G01M 3/229 |

FOREIGN PATENT DOCUMENTS

| | | |
|---|---|---|
| EP | 2907760 A1 | 8/2015 |
| WO | 2017125386 A2 | 7/2017 |
| WO | 2017191465 A2 | 11/2017 |

OTHER PUBLICATIONS

Extended European Search Report in corresponding European Application No. 18382564.5, mailed on Feb. 4, 2019, 5 pages.

* cited by examiner

*Primary Examiner* — Valentin Neacsu
*Assistant Examiner* — Mary C Hibbert-Copeland
(74) *Attorney, Agent, or Firm* — Edell, Shapiro & Finnan, LLC

(57) ABSTRACT

Method and machine for generating packages from a continuous film. In the method, the quality of the seals formed when generating packages on the film is furthermore verified, and to that end, a chamber is closed around an area of a film tube comprising an actuation area, a transverse cut and a transverse seal on each side of the transverse cut being generated in the actuation area. For the verification, pressure in the chamber is reduced, a property of the fluid present in the chamber or in the part of the tube present in the chamber is detected, and the quality of at least one of the seals present in the chamber is determined depending on the detection.

8 Claims, 4 Drawing Sheets

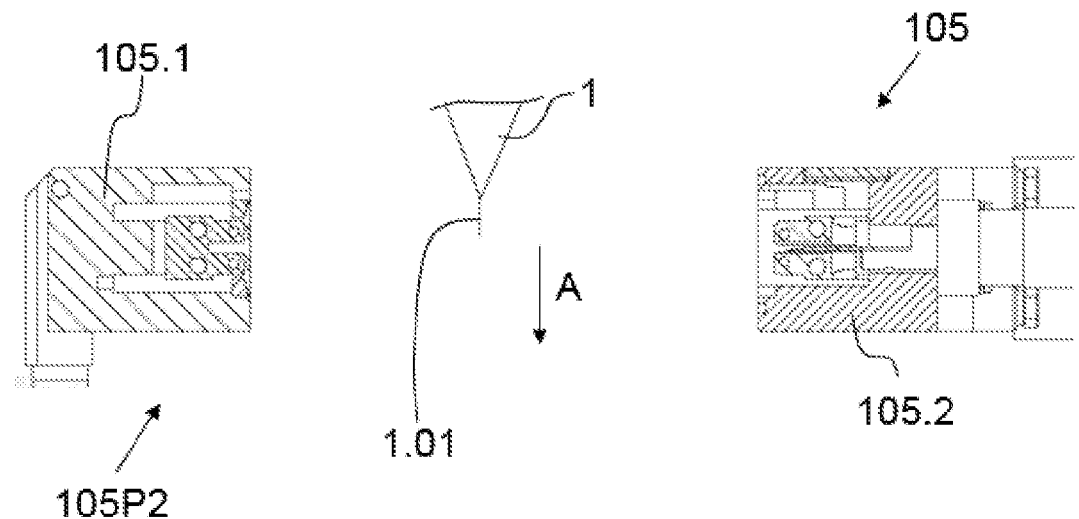
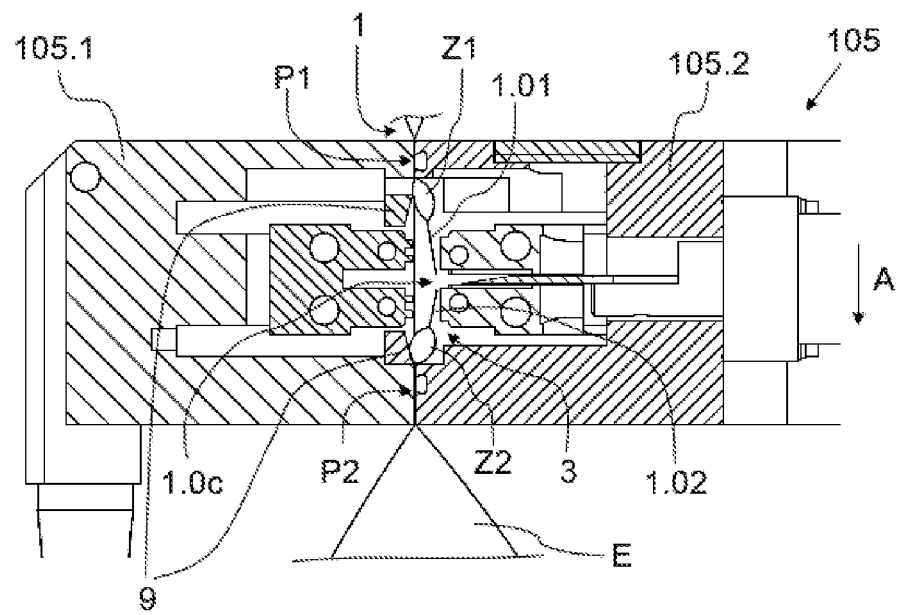
Fig. 6
Fig. 7

PACKAGING METHOD AND APPARATUS

CROSS-REFERENCE TO RELATED APPLICATIONS

This application relates to and claims the benefit and priority to European Application No. EP18382564.5, filed Jul. 27, 2018.

TECHNICAL FIELD

The present invention relates to methods for packaging and to packaging machines.

BACKGROUND

In packaging machines, products are packaged in packages comprising seals. Some of these foods require a hermetically sealed package, and any incomplete or incorrect seal negatively affects product preservation. For the purpose of verifying the quality of package seals, it is common to check the packages. To check the packages, it is common to use mechanical methods which generally comprise mechanically pressing on the package and identifying an expected response as the mechanical pressure exerted on the package increases and the package withstands the compression. Other known systems use a vacuum to expel the gases from the package through any incorrect seal. There are also systems combining both methods or other systems using optical verification systems, for example, in order to determine the quality of the seals.

The mentioned verification systems perform the check once the packages have left the packaging machine. In addition to requiring more space in the packaging plant and thorough maintenance, these systems detect incorrect seals sometime after the packages are generated, which results in a large number of packages being disposed of when an incorrect seal is detected in an analyzed package, and it sometimes also requires generating a communication between the packaging machine and the verification systems in order to communicate the detection of an incorrect seal and halt production.

WO2017191465A2 discloses a device for detecting leaks in containers. To that end, the packages are made to individually pass through a detection area. In the detection area at least one roller presses on the package exerting mechanical pressure thereon as said package moves, such that if there is an incorrect seal the gas present in the package ends up leaking out of said package. The device comprises means for generating a suction of the air in said detection area, and for determining if there is a change in carbon dioxide in the air suctioned from said detection area, determining that there are leaks in the package depending on said determination.

SUMMARY

A first aspect relates to a method for a packaging machine in which products are packaged in packages generated from a film.

According to one embodiment the method comprises:
longitudinally sealing together two longitudinal ends of the film, a film tube comprising a longitudinal seal being obtained as a result of said sealing,
performing a transverse sealing and cutting operation on an actuation area of the film tube, in which a transverse cut and a transverse seal on each side of the transverse cut are generated in said actuation area, a film tube transversely closed at one end with the transverse seal formed upstream of the transverse cut, and a package separated from said film tube by the transverse cut and comprising the transverse seal formed downstream of said transverse cut being obtained as a result of the transverse sealing and cutting operation, and
supplying the product to be packaged in a package through the film tube.

Before or during the transverse sealing and cutting operation, a chamber is closed around an area of the film tube comprising the actuation area, holding down at least one transverse hold-down area of the film tube upstream of the actuation area. After the chamber is closed, the film tube comprises, surrounded by said chamber, a first verification area between the actuation area and the hold-down area and a second verification area downstream of the actuation area.

Furthermore, with the chamber being closed, pressure inside the chamber is reduced and at least one property of a gaseous fluid present inside the chamber, inside the first verification area, and/or inside the second verification area of the film tube is detected once the transverse sealing and cutting operation has ended and during or after pressure reduction inside the chamber.

Subsequently, it is determined if there is a fluid leak in either of the verification areas of the film tube depending on said detection, determining an incorrect quality of at least one of the seals arranged inside the chamber if a leak is detected.

The properties of the gaseous fluid contained in the chamber (generally air) under normal conditions are known, and the properties of the gaseous fluid (air and/or another gas or mixture of gases) comprised in the film tube inside the first verification area and the second verification area under normal conditions are also known (amount, pressure, temperature, composition of the gaseous fluid, concentration of the gases of said fluid, for example). The properties of said gaseous fluids, i.e., both those of the fluid contained in the chamber and those of the fluid comprised in the film tube, during pressure reduction inside the chamber under normal conditions, when there is no fluid leak in either of the verification areas, are also known. It is thereby possible to determine if any of the seals arranged inside said chamber has not been correctly formed once the transverse sealing and cutting operation has ended, since pressure reduction in the chamber causes the fluid present inside at least one of the verification areas to leak out through any seal that may be incorrect, which would be noticed upon detecting the properties of the fluid present inside the chamber and/or in either of the verification areas after applying pressure reduction or during said reduction.

So, by reducing the pressure in the chamber and detecting the properties of the fluid as described, it can be determined in a simple manner during or after said pressure reduction if all the seals arranged inside the chamber are correct or if, in contrast, at least one of them is not. If the presence of a leak is determined, it is concluded that at least one of said seals is a poor-quality seal given its lack of air-tightness, whereas if no leak whatsoever is detected, said seals are determined to be good quality seals.

The proposed method also allows detecting the quality of said seals in the packaging machine itself, thereby reducing the required space (a station or machine apart from the packaging machine for said detection is dispensed with), which allows, if required, verifying the quality of the seals generated in each packaging cycle of the machine, in order to verify each package individually. This involves a reduction of the time used to verify the quality of the seals and a thorough control of the entire production of packages if required.

A second aspect relates to a packaging machine for generating packages from a continuous film.

According to one embodiment the packaging machine comprises:
- a film feeding device configured for supplying the film,
- a longitudinal sealing tool configured for longitudinally sealing together two longitudinal ends of the film with a tubular shape, a film tube with a longitudinal seal being generated, and
- a transverse sealing and cutting tool arranged downstream of the longitudinal sealing tool and forming tool, configured for transversely sealing and cutting the film tube in an actuation area of said film tube, a transverse cut and a transverse seal on each side of the transverse cut being generated in said actuation area, and a package being obtained downstream of the transverse cut after the actuation of the transverse sealing and cutting tool.

The machine may further comprise:
- a leak-tightness tool arranged downstream of the forming tool and movable between an actuation position, in which it demarcates a chamber closed around an area of the film tube comprising the actuation area, and a standby position, the transverse sealing and cutting tool being attached to the leak-tightness tool such that it is housed in the chamber when said leak-tightness tool is in the actuation position,
- an extraction device configured for reducing the pressure inside said chamber,
- a detection device configured for detecting at least one property of the gaseous fluid present in the chamber or inside the film tube and/or the package or part of the package accommodated in said chamber, and
- a control device communicated with the detection device and configured for determining the quality of the seals present in the chamber depending on the detection performed by said detection device.

The control device is furthermore configured for causing a coordinated actuation of the leak-tightness tool, the transverse sealing and cutting tool, the extraction device, and the detection device. The advantages discussed for the method are also obtained in the machine.

These and other advantages and features will become evident in view of the drawings and the detailed description.

BRIEF DESCRIPTION OF THE DRAWINGS

FIG. 6 shows a sectional view of the transverse sealing and cutting tool and the leak-tightness tool of FIG. 3, with said leak-tightness tool in a standby position.

FIG. 7 shows a sectional view of the transverse sealing and cutting tool and the leak-tightness tool of FIG. 3, with the chamber being closed and while pressure reduction inside the chamber after a transverse sealing and cutting operation is taking place.

DETAILED DESCRIPTION

Figure 1:
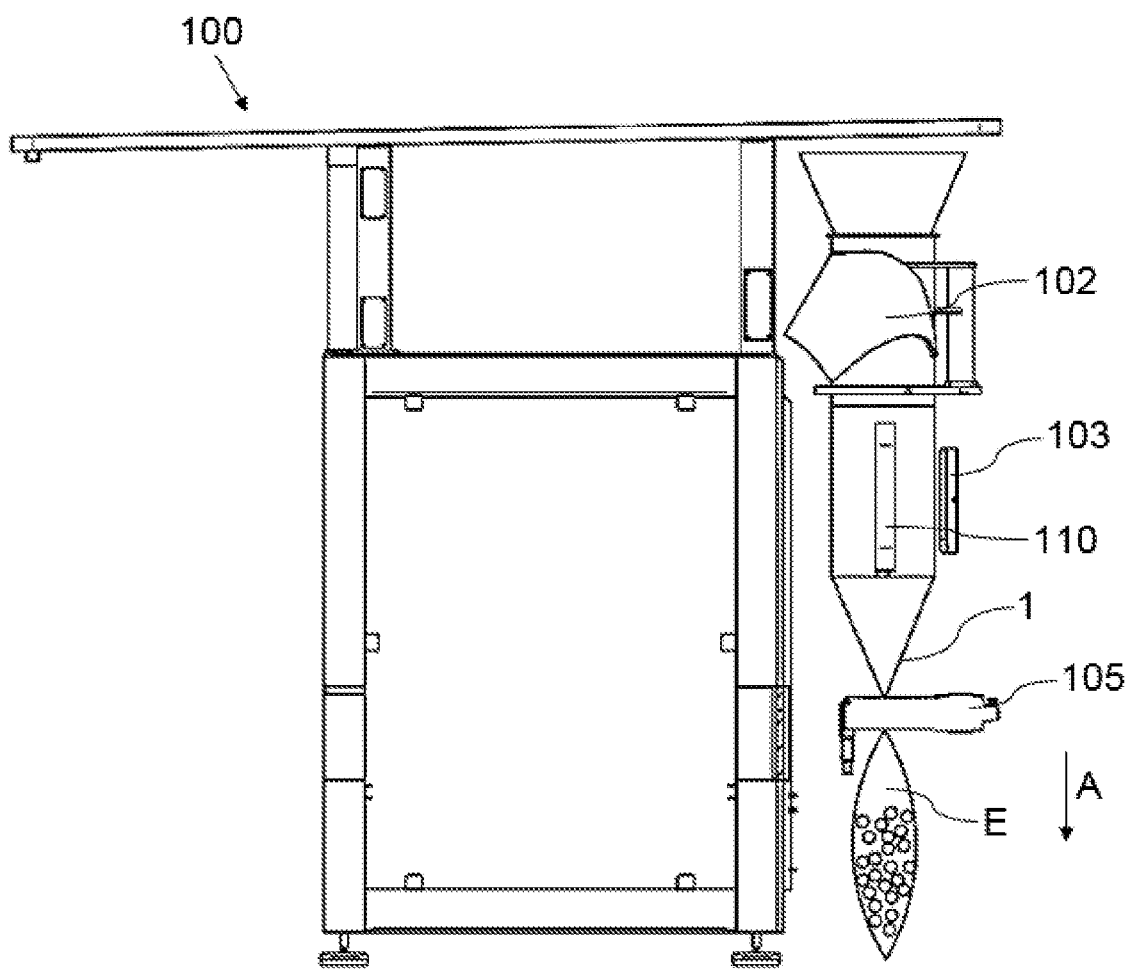
FIG. 1 shows a packaging machine according to one embodiment.

A first aspect relates to a method suitable for being used in a packaging machine 100, preferably a vertical packaging machine, such as the one shown by way of example in FIG. 1. Although the figure shows a vertical machine 100, the method is not limited to machines of this type and can also be used in horizontal or inclined machines.

In the machine 100 a film tube 1 is generated from a continuous film, giving said film a tubular shape, for example, by means of a forming tool 102 configured for such purpose and forming a longitudinal seal 1.1 on the two longitudinal ends of said film with a tubular shape. The longitudinal seal 1.1 is formed by either holding said ends together or else against the forming tool 102. As the film is fed in, the advancement of the film tube 1 in an advancement direction A is caused and said advancement can be continuous or intermittent.

Figure 2:
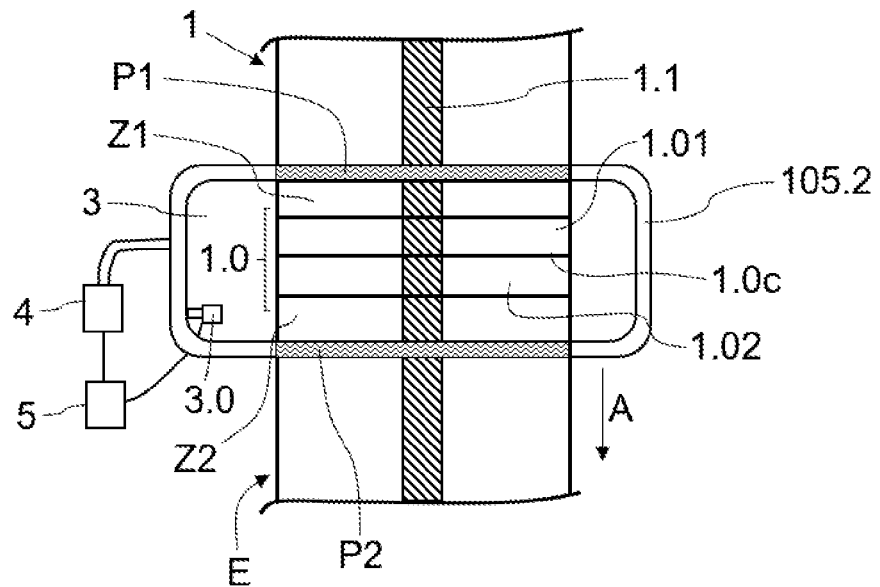
FIG. 2 schematically shows a part of a leak-tightness tool demarcating a chamber around an area of the film tube and said area of the film tube comprising an actuation area (after a transverse sealing and cutting operation according to an embodiment).

A transverse sealing and cutting operation is performed on a given actuation area 1.0 of the film tube 1, depicted by way of example in FIG. 2, arranged downstream of the longitudinal sealing tool 103. A transverse cut 1.0c and a transverse seal 1.01 and 1.02 on each side of the transverse cut 1.0c is generated in said actuation area 1.0 during said transverse sealing and cutting operation. A film tube 1 transversely closed at one end by means of a first transverse seal 1.01 (the transverse seal 1.01 generated in the transverse sealing and cutting operation, upstream of the transverse cut 1.0c), and a package E separated from said film tube 1 downstream of the transverse cut 1.0c, closed at one end with the transverse seal 1.02 generated in said transverse sealing and cutting operation downstream of the transverse cut 1.0c, and closed at the other end with the transverse seal corresponding with the first transverse seal 1.01 of the film tube 1 formed in the preceding transverse sealing and cutting operation, are obtained as a result of the transverse sealing and cutting operation. A piece of film tube 1 is physically separated from the rest of the film tube 1 with the transverse cut 1.0c, and said separated piece is a package E which evidently comprises, in addition to the two transverse seals 1.01 and 1.02, a longitudinal seal 1.1. The distance between two consecutive transverse cuts 1.0c is therefore equal to the length of the package E to be generated.

The product to be packaged is introduced in a package E between two transverse sealing and cutting operations, said product being supplied through the film tube 1.

A package E is generated in a packaging cycle. Each packaging cycle comprises a transverse sealing and cutting operation, and a package E and a transverse seal 1.01 whereby closing the film tube 1 and serving as a closure of one end of the package E that is generated in the following packaging cycle are generated in a packaging cycle. Furthermore, each packaging cycle can be implemented with the film tube 1 moving continuously in the advancement direction A, or with said film tube 1 moving intermittently in the advancement direction A. In this latter case, the advancement of the film tube 1 is interrupted to perform the transverse cutting and sealing operation, and it resumes once said operation has been performed until a new interruption (once the film tube 1 has moved forward a length equal to the length of the package E to be generated in the following packaging cycle) to generate a new package E.

Figure 3:
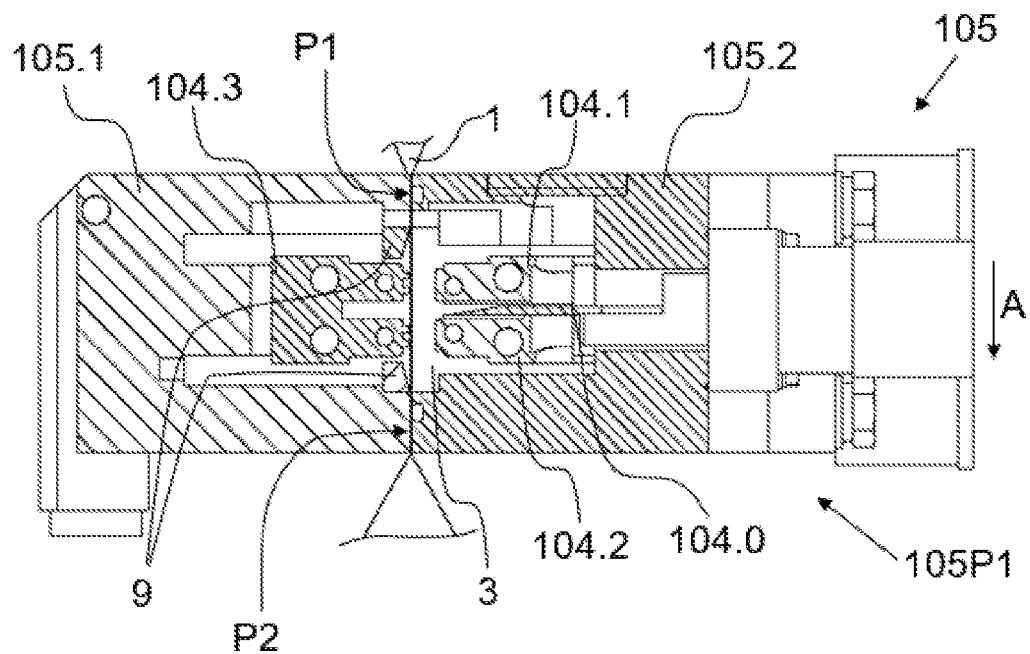
FIG. 3 shows a sectional view of a transverse sealing and cutting tool and a leak-tightness tool of the machine of FIG. 1, with a chamber being closed.
Figure 4:
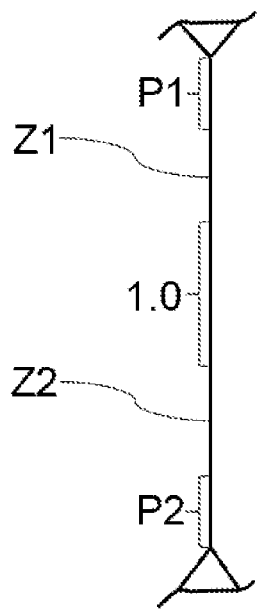
FIG. 4 shows the area of the film tube accommodated in the closed chamber of FIG. 3.

In the method, before or during the transverse sealing and cutting operation, a chamber 3 is closed around an area of the film tube 1 comprising the actuation area 1.0, holding down at least one transverse hold-down area P1 of the film tube 1 upstream of the actuation area 1.0, as shown in FIGS. 2 and 3. The chamber 3 is generated below said hold-down area P1. When the chamber 3 is closed, the film tube 1 comprises, surrounded by said chamber 3, a first verification area Z1 between the actuation area 1.0 and the hold-down area P1 and a second verification area Z2 downstream of the actuation area 1.0, depicted in FIGS. 2 and 4.

With the chamber 3 being closed, the pressure inside the chamber 3 is reduced by extracting the gas housed inside the chamber 3, and at least one property of a gaseous fluid present inside the chamber 3, inside the first verification area Z1 and/or inside the second verification area Z2 is detected once the transverse sealing and cutting operation has ended and during or after pressure reduction inside the chamber 3. Furthermore, it is determined if there is a fluid leak in either of the verification areas Z1 and Z2 depending on said detection, and an incorrect quality of at least one of the seals arranged inside the chamber 3 (the transverse seals 1.01 and 1.02 and at least part of the longitudinal seal 1.1) is determined if a leak is detected. In the event that no leak whatsoever is detected, it is determined that said seals are correct.

The presence of a leak is determined based on one of the following options:
  detecting the presence or the concentration of a given gas in the chamber 3, said given gas being a gas present inside the film tube 1 and in the package E obtained after the corresponding transverse sealing and cutting operation, determining that there is a leak when the presence of said gas is detected (for the case in which said gas should not be present in the chamber 3 under normal conditions), when in the moment of the detection a concentration of said gas higher than a predetermined value for said moment is detected, or when the detected concentration of said gas deviates from a predetermined standard progression during pressure reduction in the chamber 3;
  detecting the pressure or the amount of the gaseous fluid present in the chamber 3, determining that there is a leak when in the moment of the detection a pressure or an amount of said fluid greater than a predetermined value for said moment is detected, or when the detected pressure or the detected amount of said fluid deviates from a predetermined standard progression during pressure reduction in the chamber 3;
  detecting the pressure, the volume, or the concentration of the gaseous fluid present inside the first verification area Z1 and/or inside the second verification area Z2, determining that there is a leak when in the moment of the detection a pressure, a volume, or a concentration of said fluid less than a predetermined value for said moment in the analyzed verification area Z1 or Z2 is detected, or when the detected pressure, the detected volume, or the detected concentration of said fluid in the analyzed verification area Z1 or Z2 deviates from a predetermined standard progression during pressure reduction in the chamber 3; and
  any combination of the preceding options.

In some embodiments of the method, mechanical pressure is applied on at least one verification area Z1 and Z2, with the chamber 3 being closed, during the detection of at least one property of a gaseous fluid present inside the chamber 3, inside the first verification area Z1, and/or inside the second verification area Z2. Therefore, the pressure of the gaseous fluid present inside the verification area Z1 or Z2 being pressed increases, and the leaking of said fluid is favored in the event of comprising a defective seal, assuring to a greater extent the detection of the quality of said seals.

In some embodiments, applying this mechanical pressure further serves to determine the presence of a leak at least based on detecting the pressure or the volume of the fluid present inside the verification area Z1 and/or Z2 on which said mechanical pressure is applied. In these cases, in order to detect the pressure or volume of the gaseous fluid present inside said verification area Z1 and/or Z2, the corresponding verification area Z1 and/or Z2 is mechanically pressed by the outside of the film tube 1 or of the package E with a predetermined force, and the compression or the displacement of the fluid inside said verification area Z1 and/or Z2 is determined. The mechanical pressure on the corresponding verification area Z1 and/or Z2 can be established by means of the movement of a probe pressing said verification area Z1 or Z2, and in order to determine the presence of a leak the volume and/or the progression of the volume of said verification area Z1 or Z2 is detected; the pressure of the gaseous fluid arranged inside said verification area Z1 or Z2 is detected; or the progression of the pressure of the gaseous fluid inside said verification area Z1 or Z2 is detected, with the presence of a leak being determined when the pressure or the volume of said gaseous fluid differs from a predetermined value or progresses differently with respect to a predetermined standard during pressure reduction in the chamber 3. One probe is preferably used for each verification area Z1 and Z2, it therefore being possible to determine in which verification area Z1 and/or Z2 the leak takes place, such that it is also possible to dispose of just the package E, or just a part of the film tube 1 when an incorrect quality of any of the seals is determined.

The method can be applied for packaging with or without a modified atmosphere.

In those packaging applications with a modified atmosphere, in order to determine the presence of a leak based on detecting the presence or the concentration of a given gas in the chamber 3, said given gas being a gas present inside the film tube 1 and in the package E obtained after the corresponding transverse sealing and cutting operation, said detection is performed by means of a sensor, such as a chemical sensor, an optical chemical sensor, or an optical sensor, for example, that is housed in the chamber 3 when said chamber 3 is closed.

In the packaging applications with or without a modified atmosphere, in order to determine the presence of a leak based on detecting the pressure or the amount of the fluid present in the chamber 3, said detection is performed by means of detecting the pressure inside the chamber 3 by means of a pressure gauge, for example, or by means of detecting the flow that is evacuated from the chamber 3 during pressure reduction by means of a flow meter, for example.

In packaging applications with a modified atmosphere, in order to detect the concentration of the gaseous fluid present inside at least one of the verification areas Z1 and Z2, a sensor, an optical or optical chemical sensor, for example, is placed opposite said verification area Z1 or Z2 in order to determine the concentration of a given gas present in said verification area Z1 or Z2.

When the chamber 3 is closed, in some embodiments an additional hold-down operation is furthermore performed on the film tube 1, in an additional transverse hold-down area P2 downstream of the actuation area 1.0. In other embodiments, the chamber 3 is closed such that the entire part of the film tube 1 that is located downstream of the actuation area 1.0 is housed in said chamber 3, i.e., the entire package E is housed inside the chamber 3.

In some embodiments, the continuity of the longitudinal seal 1.1 of the film tube 1 is furthermore detected, preferably upstream of the hold-down area P1 of said film tube 1, determining an incorrect quality of the longitudinal seal 1.1 in the event of detecting a discontinuity. An infrared chamber or an ultrasonic detector facing said longitudinal seal 1.1, for example, can be used to that end.

A second aspect relates to a packaging machine 100 for generating packages E from a continuous film, with is configured for supporting the method according to the first aspect.

The machine 100 comprises a film feeding device (not depicted in the drawings) configured for supplying a continuous film. The film is wound up in the form of a reel, and the film feeding device is suitable for unwinding it and supplying it, for example, to a forming tool 102 configured for giving the film a tubular shape. The forming tool 102 comprises, for example, a tie-like area that receives the film and causes said film to surround the forming tool 102, such that a tubular shape is imparted to the film.

The machine 100 further comprises an advancement device 110 for causing the movement of the film with a tubular shape in an advancement direction A, which is a vertical direction in the case of a vertical machine 100, and a longitudinal sealing tool 103 configured for longitudinally sealing together two longitudinal ends of the film with a tubular shape, a film tube 1 with a longitudinal seal 1.1 being generated as a result of said sealing.

The generation of the film tube 1 is the first step for generating the required packages E. The machine 100 further comprises a transverse sealing and cutting tool arranged downstream of the longitudinal sealing tool 103 (and of the forming tool 102 if there is one), which is configured for transversely sealing and cutting the film tube 1 in an actuation area 1.0 of said film tube 1, a transverse cut 1.0c and a transverse seal 1.01 and 1.02 on each side of the transverse cut 1.0c being generated in said actuation area 1.0. After actuation of the transverse sealing and cutting tool, a package E is obtained downstream of the transverse cut 1.0c, and a film tube 1 that is closed (by the transverse seal 1.01) is obtained upstream of said transverse cut 1.0c. The package E is closed by the longitudinal seal 1.1 and closed at the two ends by the transverse seal 1.02 generated with said actuation and with the transverse seal 1.01 generated in the preceding actuation of the transverse sealing and cutting tool. The product to be packaged in a package E is introduced in the film tube 1 between two consecutive actuations of the transverse sealing and cutting tool using means configured for such purpose. The machine 100 is thereby configured for packaging products in packages E.

The transverse sealing and cutting tool comprises a cutting implement 104.0 for making the transverse cut 1.0c and a respective sealing implement 104.1 and 104.2 for forming each of the transverse seals 1.01 and 1.02, as shown in FIG. 3. The two sealing implements 104.1 and 104.2 preferably move integrally with one another.

Figure 5:
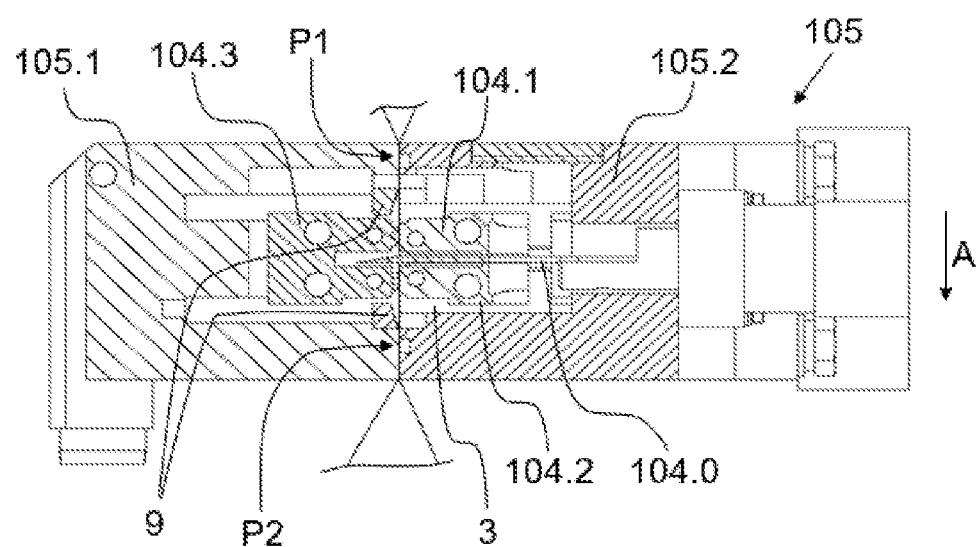
FIG. 5 shows a sectional view of the transverse sealing and cutting tool and the leak-tightness tool of FIG. 3, with the chamber being closed and with sealing and cutting implements being operative.

The transverse sealing and cutting tool is divided into two facing parts, between which the film tube 1 moves in the advancement direction A. To perform the corresponding actuation, at least one of said parts moves with respect to the other one, the corresponding area of the film tube 1 being held between said two parts, as shown in FIG. 5, which shows the actuation of the sealing implements 104.1 and 104.2 and the actuation of the cutting implement 104.0. Each sealing implement 104.1 and 104.2 preferably comprises a respective support, such that said sealing implement 104.1 and 104.2 holds the corresponding area of the film tube 1 against its respective support to form the seal. Both supports preferably belong to one and the same support element 104.3.

The proposed machine 100 is furthermore configured for determining whether or not there are leaks in the film tube 1 and/or the package E, and for determining the quality of at least one of the seals present in the chamber 3 (the transverse seals 1.01 and 1.02 and at least part of the longitudinal seal 1.1), depending on said detection.

To that end, the machine 100 further comprises a leak-tightness tool 105 arranged downstream of the longitudinal sealing tool 103 (and of the forming tool 102 if there is one) and movable between an actuation position 105P1, in which it demarcates a chamber 3 closed around an area of the film tube 1 comprising the actuation area 1.0, and a standby position 105P2, the transverse sealing and cutting tool being attached to the leak-tightness tool 105 such that it is housed in the chamber 3 when said leak-tightness tool 105 is in the actuation position 105P1. The leak-tightness tool 105 preferably comprises two parts 105.1 and 105.2 facing one another, between which the film tube 1 moves in the advancement direction A. In order to close the chamber 3, at least one of said parts moves towards the other part (preferably both parts 105.1 and 105.2 move), leaving an area of the film tube 1 between said two parts 105.1 and 105.2. Said parts 105.1 and 105.2 are configured to demarcate a space when the leak-tightness tool 105 is in the actuation position 105P1 (the chamber 3), where it can further comprise a joint for assuring a leak-tight closure of the chamber 3. The leak-tightness tool 105 can thereby be arranged in at least two positions: an actuation position 105P1 in which the chamber 3 is closed, and a standby position 105P2 in which no chamber 3 is demarcated (see FIG. 6). Each part 105.1 and 105.2 defines an inner cavity, and when the leak-tightness tool 105 is in the actuation position 105P1, both cavities are communicated with one another and define the chamber 3.

The transverse sealing and cutting tool is attached to the leak-tightness tool 105, such that the cutting implement 104.0 and the sealing implements 104.1 and 104.2 of said transverse sealing and cutting tool are arranged in the chamber 3 when said chamber 3 is closed. Said implements 104.0, 104.1 and 104.2 are attached to the leak-tightness tool 105 with freedom of movement transverse to the advancement direction A (in order to move away from and closer to the film tube 1). Each of the two facing parts of the transverse sealing and cutting tool is preferably attached with freedom of movement to a respective part 105.1 and 105.2 of the leak-tightness tool 105.

The machine 100 further comprises an extraction device 4, which is in fluid communication with the chamber 3 when said chamber 3 is closed. To that end, the extraction device 4 is in fluid communication with the cavity defined by at least one of the parts 105.1 or 105.2 of the leak-tightness tool 105. The extraction device 4 is configured for reducing the pressure in the chamber 3, through said fluid communication. In some embodiments, the extraction device 4 comprises a suction pump or a similar device for extracting the gas that is inside the chamber 3, whereas in other embodiments it may comprise an injector for injecting air into a conduit through which it communicates with the corresponding cavity, as close as possible to said cavity, such that it causes a negative pressure at said injection point (therefore on the cavity), a suction of the fluid present in the area where the negative pressure (Venturi effect) has been generated being caused and the gas present inside the chamber 3 thereby being extracted.

When the pressure inside the chamber 3 is reduced, the gaseous fluid present in the film tube 1, in the package E, or in the part of the package E accommodated in said chamber 3, between the hold-down areas P1 and P2, increases in volume, as shown by way of example in FIG. 7 (where the suction after the transverse sealing and cutting operation is depicted), such that if any of the seals present in the chamber 3 is not correctly formed, said pressure reduction in the chamber 3 would cause said fluid to leak towards the chamber 3, and there would be a leak.

The machine 100 further comprises a detection device 3.0, which is configured for detecting at least one property of the gaseous fluid present in the chamber 3 or inside the film tube 1 and/or the package E or the part of the package E accommodated in said chamber 3, and a control device 5 which is communicated with the detection device 3.0 and configured for determining the quality of the seals present in the chamber depending on the detection performed by said detection device 3.0. Depending on said detection, the control device 5 is capable of determining if there are leaks from the inside of the package E and/or film tube 1, so is capable of determining whether or not the quality of said seals is correct: if there are leaks, the quality is incorrect, where the quality is correct if it is determined that there is no leak.

The control device 5 is furthermore configured for causing a coordinated actuation of the transverse sealing and cutting tool, the leak-tightness tool, the extraction device 4, and the detection device 3.0, the machine 100 thereby being configured for supporting and implementing the method of the first aspect.

The detection device 3.0 is preferably arranged in one of the parts 105.1 or 105.2 of the leak-tightness tool 105 (in the cavity defined by said part 105.1 or 105.2). The detection device 3.0 comprises at least one sensor, and the type of sensor depends on the required detection (the detection device 3.0 may comprise, for example, optical sensors, optical chemicals sensors, chemical sensors, pressure gauges, or flow meters). In the event that the detection device 3.0 has a plurality of sensors, they may be interchangeably attached to either part 105.1 and 105.2, with the only requirement to be met being that they must be housed in the chamber 3 or they must be in fluid communication with the chamber 3 (depending on the type of sensor it is) when said chamber 3 is generated or closed.

The detection device 3.0 may therefore comprise, for example, at least one sensor configured for detecting the presence or the concentration of a given gas in the chamber 3, the control device 5 in this case being configured for determining an incorrect quality of at least one of the corresponding seals when the presence of said gas is detected, when in the moment of the detection a concentration of said gas higher than a predetermined value for said moment is detected, or when the detected concentration of said gas deviates from a predetermined standard progression; and/or at least one sensor configured for detecting the pressure or the amount of the gaseous fluid present in the chamber 3, the control device 5 in this case being configured for determining an incorrect quality of at least one of the corresponding seals if the detected pressure or the detected amount of the gaseous fluid differs from a predetermined threshold value, or if the progression of the pressure or of the amount of the gaseous fluid present in the chamber 3 deviates from a predetermined standard progression.

The leak-tightness tool 105 may comprise a length in the advancement direction A that is larger than the length of the generated packages E, such that when the chamber 3 is generated or closed, a package E is housed in said chamber 3 and the quality of all the seals of said package E is verified. Alternatively, the leak-tightness tool 105 may comprise a length in the advancement direction A that is less than the length of the generated packages E, as depicted in the drawings, such that after the corresponding transverse sealing and cutting operation, a package E is partially housed in said chamber 3, with the entire product of the package E preferably being arranged downstream of the chamber 3.

In some embodiments, the machine 100 further comprises a detection device not depicted in the drawings, facing the forming tool 102 and arranged downstream of the longitudinal sealing tool 103 in the advancement direction A (and of the forming tool 102 if there is one), configured for detecting the continuity of the longitudinal seal 1.1 of the film tube 1 and communicated with the control device 5, said control device 5 being configured for determining whether or not the longitudinal seal 1.1 is correct depending on said detection. The detection device may comprise, for example, an infrared chamber or an ultrasonic detector.

In some embodiments, the machine 100 comprises a pressure element 9, attached to the leak-tightness tool 105 and facing the film tube 1. The pressure element 9 is configured for applying mechanical pressure on the film tube 1 and/or on the package E or the part of the package E accommodated in the chamber 3, such that it increases the pressure of the gaseous fluid present inside the film tube 1 and/or the package E or the part of the package E present in the chamber 3, and favors said fluid leaking towards the chamber 3 when a seal is defective. The pressure element 9 could be a probe, for example, such as the one described for the first aspect of the invention.

In some embodiments, the detection device is configured for detecting the pressure exerted by the pressure element 9 and/or the movement of the pressure element 9 upon pressing against the area of the film tube 1 and/or of the package E present in the chamber 3 on which it acts, as described for the first aspect.

The following clauses represent further embodiments.

Clause 1: A method for a packaging machine in which products are packaged in packages (E) generated from a film, the method comprising the steps of longitudinally sealing together two longitudinal ends of the film, a film tube (1) with a longitudinal seal (1.1) being obtained as a result of said sealing, performing a transverse sealing and cutting operation on an actuation area (1.0) of the film tube (1), in which a transverse cut (1.0c) and a transverse seal (1.01, 1.02) on each side of the transverse cut (1.0c) are generated in said actuation area (1.0), a film tube (1) transversely closed at one end with the transverse seal (1.01) formed upstream of the transverse cut (1.0c), and a package (E) separated from the film tube (1) by the transverse cut (1.0c) comprising the transverse seal (1.02) formed downstream of said transverse cut (1.0c) being obtained as a result of the transverse sealing and cutting operation, and supplying the product to be packaged in a package (E) through the film tube (1), before or during the transverse sealing and cutting operation, a chamber (3) is closed around an area of the film tube (1) comprising the actuation area (1.0), holding down at least one transverse hold-down area (P1) of the film tube (1) upstream of the actuation area (1.0), the film tube (1) comprising, surrounded by the chamber (3), a first verification area (Z1) between the actuation area (1.0) and the hold-down area (P1) and a second verification area (Z2) downstream of the actuation area (1.0), and with the chamber (3) being closed, the pressure inside the chamber (3) is reduced and at least one property of a gaseous fluid present inside the chamber (3), inside the first verification area (Z1) and/or inside the second verification area (Z2) is detected once the transverse sealing and cutting operation has ended and during or after pressure reduction inside the chamber (3), determining if there is a leak of gaseous fluid in either of the verification areas (Z1, Z2) depending on said detection, and determining an incorrect quality of at least one of the seals (1.01, 1.02, 1.1) arranged inside the chamber (3) if a leak is detected.

Clause 2: The method according to clause 1, wherein the presence of a leak is determined based on one of the following options:

detecting the presence or the concentration of a given gas in the chamber (3), said given gas being a gas present inside the film tube (1) and in the package (E) obtained after the corresponding transverse sealing and cutting operation, determining that there is a leak when the presence of said gas is detected, when in the moment of the detection a concentration of said gas higher than a predetermined value for said moment is detected, or when the detected concentration of said gas deviates from a predetermined standard progression during pressure reduction in the chamber (3);

detecting the pressure or the amount of the gaseous fluid present in the chamber (3), determining that there is a leak when in the moment of the detection a pressure or an amount of said fluid greater than a predetermined value for said moment is detected, or when the detected pressure or the detected amount of said fluid deviates from a predetermined standard progression during pressure reduction in the chamber (3);

detecting the pressure, the volume, or the concentration of the gaseous fluid present inside the first verification area (Z1) and/or inside the second verification area (Z2), determining that there is a leak when in the moment of the detection a pressure, a volume, or a concentration of said fluid less than a predetermined value for said moment in the analyzed verification area (Z1, Z2) is detected, or when the detected pressure, the detected volume, or the detected concentration of said fluid in the analyzed verification area (Z1, Z2) deviates from a predetermined standard progression during pressure reduction in the chamber (3); and any combination of the preceding options.

Clause 3: The method according to clause 1 or 2, wherein mechanical pressure is applied on at least one verification area (Z1, Z2), with the chamber (3) being closed, during the detection of at least one property of a gaseous fluid present inside the chamber (3), inside the first verification area (Z1), and/or inside the second verification area (Z2).

Clause 4: The method according to clause 3, wherein the presence of a leak is determined at least based on detecting the pressure or the volume of the gaseous fluid present inside the verification area (Z1, Z2) on which mechanical pressure is applied, and in order to detect the pressure or the volume of the gaseous fluid present inside said verification area (Z1, Z2), said verification area (Z1, Z2) is mechanically pressed by the outside of the film tube (1) or of the package (E) with a predetermined force, and the compression or the displacement of the fluid in said verification area (Z1, Z2) is determined.

Clause 5: The method according to any of clauses 2 to 4, wherein the presence of a leak is determined at least based on detecting the presence or the concentration of a given gas in the chamber (3), said given gas being a gas present inside the film tube (1) and in the package (E) obtained after the transverse sealing and cutting operation, and said detection is performed by means of a sensor that is housed in the chamber (3) when said chamber (3) is closed.

Clause 6: The method according to any of clauses 2 to 4, wherein the presence of a leak is determined at least based on detecting the pressure or the amount of the gaseous fluid present in the chamber (3), and said detection is performed by means of detecting the pressure inside the chamber (3) or by means of detecting the flow that is evacuated from the chamber (3) during pressure reduction.

Clause 7: The method according to any of clauses 1 to 6, wherein when the chamber (3) is closed, an additional hold-down operation is performed in an additional transverse hold-down area (P2), downstream of the actuation area (1.0).

Clause 8: The method according to any of clauses 1 to 7, wherein the continuity of the longitudinal seal (1.1) of the film tube (1) upstream of the chamber (3) is detected, with an incorrect quality of the longitudinal seal (1.1) being determined in the event of detecting a discontinuity.

Clause 9: A packaging machine comprising:

a film feeding device configured for supplying the film, a longitudinal sealing tool (103) configured for longitudinally sealing together two longitudinal ends of the film with a tubular shape, a film tube (1) with a longitudinal seal (1.1) being generated as a result of said sealing, and a transverse sealing and cutting tool arranged downstream of the longitudinal sealing tool (103), and configured for transversely sealing and cutting the film tube (1) in an actuation area (1.0) of said film tube (1), a transverse cut (1.0c) and a transverse seal (1.01, 1.02) on each side of the transverse cut (1.0c) being generated in said actuation area (1.0), and a package (E) being obtained downstream of the transverse cut (1.0c) after the actuation of the transverse sealing and cutting tool, the machine (100) further comprises:

a leak-tightness tool (105) arranged downstream of the longitudinal sealing tool (103) and movable between an actuation position (105P1), in which it demarcates a chamber (3) closed around an area of the film tube (1) comprising the actuation area (1.0), and a standby position (105P2), the transverse sealing and cutting tool being attached to the leak-tightness tool (105) such that it is housed in the chamber (3) when said leak-tightness tool (105) is in the actuation position (105P1), an extraction device (4) configured for reducing the pressure inside said chamber (3), a detection device (3.0) configured for detecting at least one property of the gaseous fluid present in the chamber (3) or inside the film tube (1) and/or the package (E) or part of the package (E) accommodated in said chamber (3), and a control device (5) communicated with the detection device (107) and configured for determining the quality of the seals (1.01, 1.02, 1.1) present in the chamber (3) depending on the detection performed by said detection device, the control device (5) furthermore being configured for causing a coordinated actuation of the leak-tightness tool (105), the transverse sealing and cutting tool, the extraction device (4), and the detection device.

Clause 10: The machine according to clause 9, wherein the detection device comprises at least one sensor configured for detecting the presence or the concentration of a given gas in the leak-tight chamber (3), the control device (5) being configured for determining an incorrect quality of at least one of the corresponding seals when the presence of said gas is detected, when in the moment of the detection a concentration of said gas higher than a predetermined value for said moment is detected, or when the detected concentration of said gas deviates from a predetermined standard progression; and/or at least one sensor configured for detecting the pressure or the amount of the gaseous fluid present in the leak-tight chamber (3), the control device (5) being configured for determining an incorrect quality of at least one of the corresponding seals if the detected pressure or the detected amount of the gaseous fluid differs from a predetermined threshold value or if the progression of the pressure or of the amount of the gaseous fluid present in the leak-tight chamber (3) deviates from a predetermined standard progression.

Clause 11: The machine according to clause 9 or 10, wherein the leak-tightness tool (105) comprises two parts (105.1, 105.2) facing one another and facing the film tube (1), between which said film tube (1) moves in the advancement direction (A), at least one of said parts (105.1, 105.2) being configured for moving towards the other part (105.1, 105.2) in order to generate or close the chamber (3) in an actuation position (105P1), each part (105.1, 105.2) of the leak-tightness tool (105) defining an inner cavity such that when the leak-tightness tool (105) is in the actuation position (105P1), both cavities are communicated with one another and define the chamber (3).

Clause 12: The machine according to clause 11, wherein the detection device comprises at least one sensor which is attached to one of the parts (105.1, 105.2) of the leak-tightness tool (105) and housed in the cavity defined by said part (105.1, 105.2) or in fluid communication with said cavity.

Clause 13: The machine according to any of clauses 9 to 12, comprising a pressure element (9) attached to the leak-tightness tool (105) and facing the film tube (1), the pressure element (9) being configured for pressing on at least one area of the film tube (1) and/or of the package (E) present in the chamber (3) when said chamber (3) is closed.

Clause 14: The machine according to clause 13, wherein the detection device is configured for detecting the pressure exerted by the pressure element (9) and/or the movement of the pressure element (9) upon pressing against the area of the film tube (1) and/or of the package (E) present in the chamber (3) on which it acts.

Clause 15: The machine according to any of clauses 9 to 14, wherein the leak-tightness tool (105) comprises a length in the advancement direction (A) that is less than the length of the generated packages (E), such that when the leak-tight chamber (3) is generated or closed, a package (E) is partially housed in said leak-tight chamber (3).

What is claimed is:

1. A packaging machine comprising:
   a film feeding device configured for supplying the film, the film having a first longitudinal end and a second longitudinal end;
   a longitudinal sealing tool configured to longitudinally seal together the first longitudinal end of the film with the second longitudinal end of the film to form a film tube;
   a transverse sealing and cutting tool arranged downstream the longitudinal sealing tool, the transverse cutting tool configured to produce in an actuation area of the film tube a transverse cut, the transverse sealing tool configured to produce in the actuation area a first transverse seal upstream the transverse cut and a second transverse seal downstream the transverse cut, the second transverse seal being a part of a package that houses a product;
   a leak-tightness tool arranged downstream the longitudinal sealing tool and movable between a standby position and an actuation position, in the actuation position the leak-tightness tool demarcates a chamber closed around an area of the film tube that includes the actuation area, the transverse sealing and cutting tool being attached to the leak-tightness tool such that it is housed in the chamber when the leak-tightness tool is in the actuation position;
   an extraction device configured to reduce a pressure inside the chamber after the transverse sealing tool has produced the first and second transverse seals;
   a detection device located outside the film tube and configured to detect at least one property of a gaseous fluid present in the chamber while the chamber is closed around the area of the film tube that includes the actuation area, the detection device configured to detect the at least one property of the gaseous fluid after the first and second transverse seals are produced and during or after reducing the pressure inside the chamber, the detection device being configured to detect the at least one property of the gaseous fluid in a portion of the chamber that is designated to at least partially surround the actuation area of the film tube; and
   a control device communicated with the detection device and configured to determine a quality of the longitudinal seal, and the first and second transverse seals present in the chamber based on the detection of the at least one property of the gaseous fluid present in the chamber, the control device further being configured to coordinate an actuation of the leak-tightness tool, the transverse sealing and cutting tool, the extraction device, and the detection device.

2. The packaging machine according to claim 1, wherein the detection device comprises at least one sensor configured to detect a presence or a concentration of the gaseous fluid in the portion of the chamber that is designated to at least partially surround the actuation area of the film tube, the control device being configured to determine an incorrect quality of at least one of the longitudinal seal and the first and second transverse seals when the presence of the gaseous fluid is detected or when the concentration of the gaseous fluid is higher than a predetermined concentration value, or when the detected concentration of the gaseous fluid deviates from a predetermined standard progression.

3. The packaging machine according to claim 1, wherein the detection device comprises at least one sensor configured to detect a pressure or the amount of the gaseous fluid present in the portion of the chamber that is designated to at least partially surround the actuation area of the film tube, the control device being configured for determining an incorrect quality of at least one of the longitudinal seal and the first and second transverse seals if the detected pressure or the detected amount of the gaseous fluid differs from a predetermined threshold value or if the progression of the pressure or of the amount of the gaseous fluid present in the chamber deviates from a predetermined standard progression.

4. The packaging machine according to claim 1, wherein the leak-tightness tool comprises a first part and a second part between which the film tube moves in an advancement direction, the first and second parts arranged facing one another and facing the film tube, at least one of the first and second parts being configured to move towards the other to cause the leak-tightness tool to assume the actuation position, the first part of the leak-tightness tool defining a first inner cavity, the second part of the leak-tightness tool defining a second inner cavity such that when the leak-tightness tool is in the actuation position, the first and second inner cavities are communicated with one another and define the chamber.

5. The packaging machine according to claim 4, wherein the detection device comprises at least one sensor that is attached to one of the first and second parts of the leak-tightness tool, the detection device being located inside one of the first and second inner cavities or being in fluid communication with one of the first and second inner cavities.

6. The packaging machine according to claim 1, further comprising a pressure element attached to the leak-tightness tool and facing the film tube, the pressure element being configured to press on at least one area of the film tube and/or on a part of the package present in the chamber when the chamber is closed.

7. The packaging machine according to claim 6, wherein the detection device is configured to detect a pressure exerted by the pressure element and/or the movement of the pressure element upon the pressure element pressing against the area of the film tube and/or against the part of the package.

8. The packaging machine according to claim 1, wherein the leak-tightness tool has a length in the advancement direction that is less than a length of the package, such that when the chamber is formed the package is at least partially housed in the chamber.

* * * * *